(12) United States Patent
Reichert et al.

(10) Patent No.: US 11,175,825 B1
(45) Date of Patent: Nov. 16, 2021

(54) CONFIGURATION-BASED ALERT CORRELATION IN STORAGE NETWORKS

(71) Applicant: International Business Machines Corporation, Armonk, NY (US)

(72) Inventors: Christoph Reichert, Nierstein (DE); Willi Wuensch, Stadecken-Elsheim (DE); Dietmar Noll, Bad Soden-Salmünster (DE)

(73) Assignee: International Business machines Corporation, Armonk, NY (US)

( * ) Notice: Subject to any disclaimer, the term of this patent is extended or adjusted under 35 U.S.C. 154(b) by 0 days.

(21) Appl. No.: 15/930,480

(22) Filed: May 13, 2020

(51) Int. Cl.
*G06F 13/00* (2006.01)
*G06F 3/06* (2006.01)

(52) U.S. Cl.
CPC .......... *G06F 3/0604* (2013.01); *G06F 3/067* (2013.01); *G06F 3/0653* (2013.01)

(58) Field of Classification Search
CPC ....... G06F 3/0604; G06F 3/067; G06F 3/0653
See application file for complete search history.

(56) References Cited

U.S. PATENT DOCUMENTS

| | | | | |
|---|---|---|---|---|
| 6,154,849 | A * | 11/2000 | Xia | H04L 41/0631 709/220 |
| 6,393,386 | B1 | 5/2002 | Zager | |
| 7,382,244 | B1 * | 6/2008 | Donovan | H04L 41/22 340/506 |
| 9,418,088 | B1 * | 8/2016 | Noll | H04L 67/1097 |
| 9,460,399 | B1 * | 10/2016 | Stacey | G06F 9/46 |
| 10,223,190 | B2 | 3/2019 | Noll | |
| 10,270,668 | B1 * | 4/2019 | Thompson | H04L 41/5009 |
| 2005/0278273 | A1 * | 12/2005 | Uthe | H04L 41/0631 |
| 2006/0190775 | A1 * | 8/2006 | Aggarwal | H04L 41/0816 714/100 |
| 2010/0321183 | A1 * | 12/2010 | Donovan | G08B 13/19645 340/540 |
| 2012/0221678 | A1 * | 8/2012 | Tanaka | H04L 1/1835 709/217 |
| 2015/0319352 | A1 * | 11/2015 | Donovan | H04N 7/183 348/159 |
| 2017/0249199 | A1 * | 8/2017 | Tripathi | G06F 11/0766 |

OTHER PUBLICATIONS

"Correlating Alerts Using Prerequisites of Intrusions" by Ning, Peng; Reeves, Douglas S.; Cui, Yun; 2001; ftp://ftp.ncsu.edu/pub/unity/lockers/ftp/csc_anon/tech/2001/TR-2001-13.ps.Z http://www.lib.ncsu.edu/resolver/1840.4/786 (Year: 2001).*

"nsider Threat Control: Understanding Data Loss Prevention (DLP) and Detection by Correlating Events from Multiple Sources" by George Silowash, Christopher King; Jan. 2013 (Year: 2013).*

Mell et al., "The NIST Definition of Cloud Computing", Recommendations of the National Institute of Standards and Technology, Special Publication 800-145, Sep. 2011, 7 pages.

* cited by examiner

*Primary Examiner* — Jing-Yih Shyu
(74) *Attorney, Agent, or Firm* — David K. Mattheis; Maeve M. Carpenter (57) ABSTRACT

Correlating storage system event alerts by receiving notice of an event, determining a first storage network system (SNS) resource related to the event, determining instantiated dependencies between the first SNS resource and a second SNS resource, correlating the event with a second event according to the instantiated dependencies, and providing notice of the correlated events.

14 Claims, 7 Drawing Sheets

CONFIGURATION-BASED ALERT CORRELATION IN STORAGE NETWORKS

BACKGROUND

The disclosure relates generally to correlating storage system event alerts. The disclosure relates particularly to correlating storage network systems event alerts according to network resource dependencies.

Storage networks include large numbers of interconnected entities including disks, storage pools, and storage volumes distributed across numerous computing environments including across multiple cloud resources. Managing these networks requires awareness of network events enabling pro-active or timely responses to issues developing in the networks.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products correlate and aggregate storage network system event alerts.

Aspects of the invention disclose methods, systems and computer readable media associated with correlating storage system event alerts by receiving notice of an event, determining a first storage network system (SNS) resource related to the event, determining instantiated dependencies between the first SNS resource and one or more additional SNS resources, correlating the event with a second event according to the instantiated dependencies, and providing notice of the correlated events.

Aspects of the invention disclose methods, systems and computer readable media associated with correlating storage system event alerts by maintaining a description of storage network system resource dependencies, receiving notice of a SNS resource event, determining a first SNS resource related to the event, determining instantiated dependencies between the first SNS resource and one more additional SNS resources according to the description of SNS resource dependencies, correlating the event with a second event according to a correlation factor associated with the instantiated dependencies, and providing notice of the correlated events.

Aspects of the invention disclose methods, systems and computer readable media associated with correlating storage system event alerts by maintaining a generic description of storage network system resource dependencies, the generic description including dependency weights between SNS resources, adjusting dependency weights according to SNS resource activity, receiving notice of a SNS resource event, determining a first SNS resource related to the event, determining instantiated dependencies between the first SNS resource and a second SNS resource according to an instantiated version of the generic description of SNS resource dependencies, aggregating the event with a second event according to a correlation factor associated with the instantiated dependencies, and providing notice of the correlated events.

Aspects of the invention disclose methods, systems and computer readable media associated with correlating storage system event alerts by maintaining a generic description of storage network system resource dependencies, the generic description including dependency weights between SNS resources, adjusting dependency weights according to the frequency of temporal concurrence of SNS resource activity, receiving notice of a SNS resource event, determining a first SNS resource related to the event, determining instantiated dependencies between the first SNS resource and a second SNS resource according to an instantiated version of the generic description of SNS resource dependencies, aggregating the event with a second event according to a correlation factor associated with the instantiated dependencies, and providing notice of the correlated events.

Aspects of the invention disclose methods, systems and computer readable media associated with correlating storage system event alerts by maintaining a generic description of storage network system resource dependencies, the generic description including dependency weights between SNS resources, adjusting dependency weights according to SNS resource event correlation feedback, receiving notice of a SNS resource event, determining a first SNS resource related to the event, determining instantiated dependencies between the first SNS resource and a second SNS resource according to an instantiated version of the generic description of SNS resource dependencies, aggregating the event with a second event according to a correlation factor associated with the instantiated dependencies, and providing notice of the aggregated events.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., determining resources related to a storage network event, evaluating dependencies between storage network resources, correlating event alerts according to resource dependencies, and providing notice of correlated event alerts etc.). These solutions are not abstract and cannot be performed as a set of mental acts by a human due to the processing capabilities needed to facilitate storage network event alert correlation, for example. Further, some of the processes performed may be performed by a specialized computer for carrying out defined tasks related to memory operations. For example, a specialized computer can be employed to carry out tasks related to correlating storage network event alerts, or the like.

Storage network administrative awareness may be driven by system alerts for network events providing further details regarding network resource issues. Large networks can have large numbers of alerts, particularly as a single event triggering an alert can also trigger a ripple of additional related events across the network of resources. As an example, a failing network disk drive may cause the related storage pool to sow a non-normal state. The storage pool non-normal state may be reflected in a non-normal state alert for all the storage volumes in the storage pool. Alerts associated with all the volumes in all the pools associated with the failing disk may number in the hundreds. Addressing outages requires network administrators to focus their efforts upon real-time incidents. Aggregating related events into a single common incident enables administrators to better utilize their time by addressing a consolidated set of events rather than addressing events individually. Correlating events also enables better prioritization of concurrent events by enabling administrators to determine which incidents have the largest resource scope and the largest impact upon the overall storage network. The disclosed methods and systems correlate concurrent events across network resources and aggregate correlated events, reducing the number of incidents presented to an administrator. Automatic correlation of related event alerts relieves system administrators from manually attempting to correlate events. Automatic correlation and accompanying aggregation of events improves system administrators' abilities to assess event relevance and prioritize event responses by providing a view of the full scope of an event in terms of all related events and impacted SNS resources associated with an originating event.

In an embodiment, the disclosed methods receive notice of a storage network event impacting a particular network resource, the methods evaluate concurrent events to determine if any concurrent events should be aggregated as a common incident and report out any aggregated events for attention. In an embodiment, the systems of the method receive event alerts from top level elements of a storage network system such as storage systems, network switches or computer systems. In this embodiment, the event details vary by resource type and may include device identifiers, device sub-entity data and alert type data. In an embodiment, the event alert contains further details including affected resources as well as details regarding resource attribute changes. The disclosed methods maintain and update a graph, tree, or mapping of the storage network system resources including mapping the relative dependencies between storage network system resources. Over time, the relative weightings assigned to the possible dependencies between network elements evolve using either user feedback on the correlation method's performance, or a combination of temporal concurrence below a threshold and a correlation factor above a defined threshold, to adjust resource dependency weights up or down as appropriate.

Figure 1:
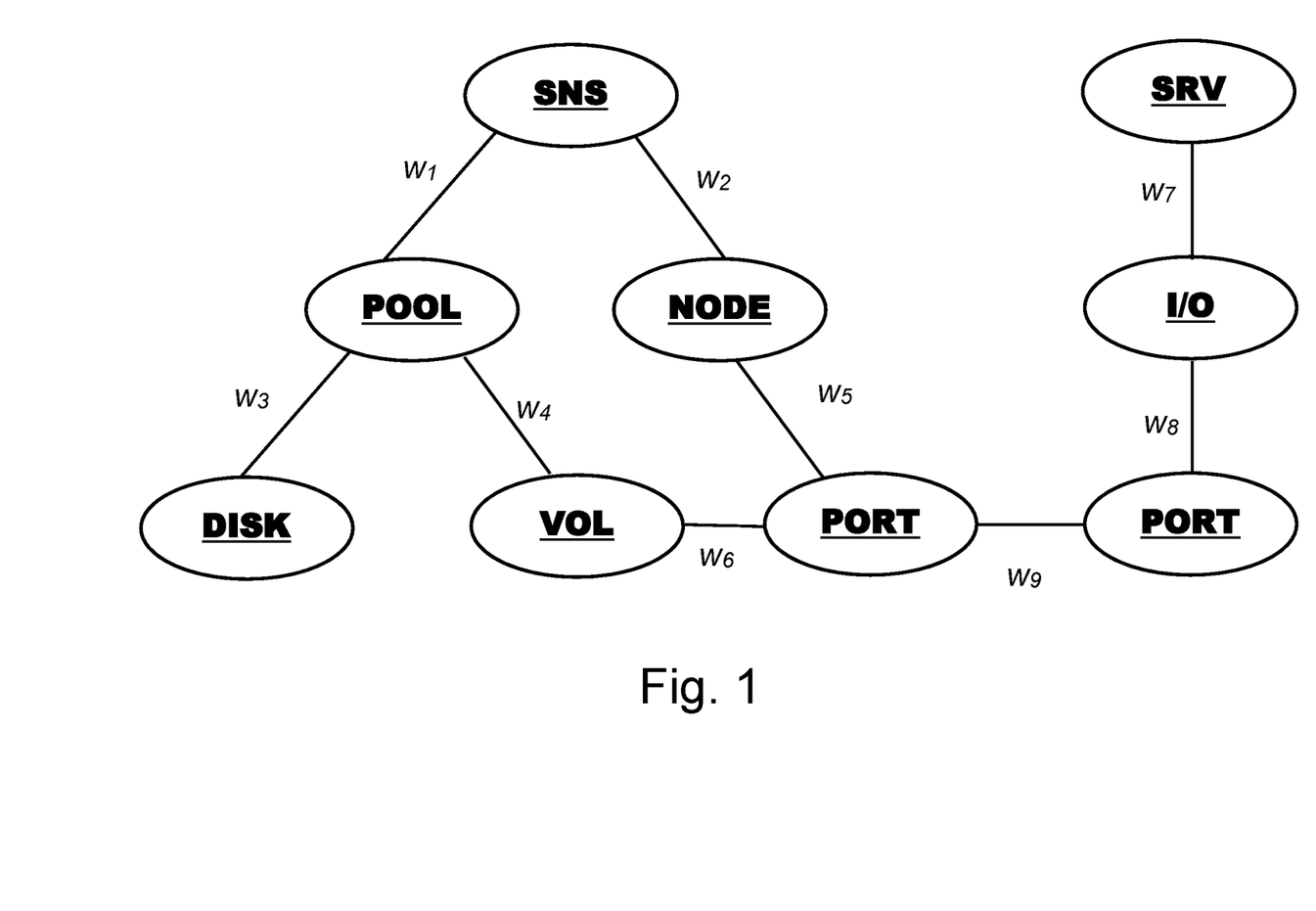
FIG. 1 provides a schematic illustration of a generic SNS resource tree, according to an embodiment of the invention.

FIG. 1 illustrates a generic graph, tree, or mapping of a storage network system (SNS). As shown in the figure, the SNS includes a hierarchy of resources including a storage network hub resource SNSHR X, one or more storage pool resources POOL, disk resources DISK, downstream from the storage pool, storage volumes VOL, also downstream from the storage pool, nodes resources NODE, downstream from the SNSHR, communication ports PORTS, downstream from the NODES, adjacent ports, input/output bus adapters I/O, and storage network servers SRV. The tree includes both hardware (disk, I/O bus adapters, servers) and virtual (pool and volume) aspects of the SNS as both hardware and virtual SNS aspects may experience events triggering alerts. In an embodiment, the generic dependency tree captures human expert knowledge regarding the structure and operation of a particular SNS type. Different SNS types will have different generic trees.

In an embodiment, the generic tree captures expert knowledge regarding the conceptual relationships between the SNS resources—pools, volumes, disks, ports—and in combination with the dependency weights, how much influence each resource has upon other related resources, how much an event at one resource impacts or causes events at other resources.

FIG. 1 also illustrates weightings $w_x$ assigned to the edges representing SNS resource connections. In an embodiment, the initial weighting $w_x$ are defined using SNS expert input regarding the relative importance of resource relationships to related SNS resource events. In an embodiment, all generic tree (graph) weightings are set to a value between 0 and 1, where a value of 1 indicates the highest level of correlation between SNS resources. In an embodiment, initial dependency weights are set using expert knowledge regarding the SNS type. In an embodiment, all dependency weights are set to a default value such as 0.1 or 0.5. As an example, from FIG. 1, to indicate that the relationship between a storage pool and a disk is more relevant than the relationship between the pool and the storage network system, $w_3$ would be greater than $w_1$. In this embodiment, the values of the weightings for the generic SNS tree are adjusted over time as network resource events are evaluated and correlated to each other.

After receiving an alert regarding the occurrence of an SNS event, the method instantiates a tree of the SNS, focusing upon the relationships and connections of the SNS resource associated with the event alert. As used herein "instantiated" refers to a SNS resource tree starting with the SNS resource which is the subject of the current SNS alert—the event origin resource—and graphing all SNS resources related to the source or event origin resource. The instantiated tree reduces the SNS resources considered in relation to the received event alert by eliminating from consideration resources having no relationship with the origin resource. As an example, the instantiated tree for an event related to a storage pool includes volumes associated with the storage pool but not any of the volumes associated with other storage pools but not associated with the storage pool of the event.

Figure 2:
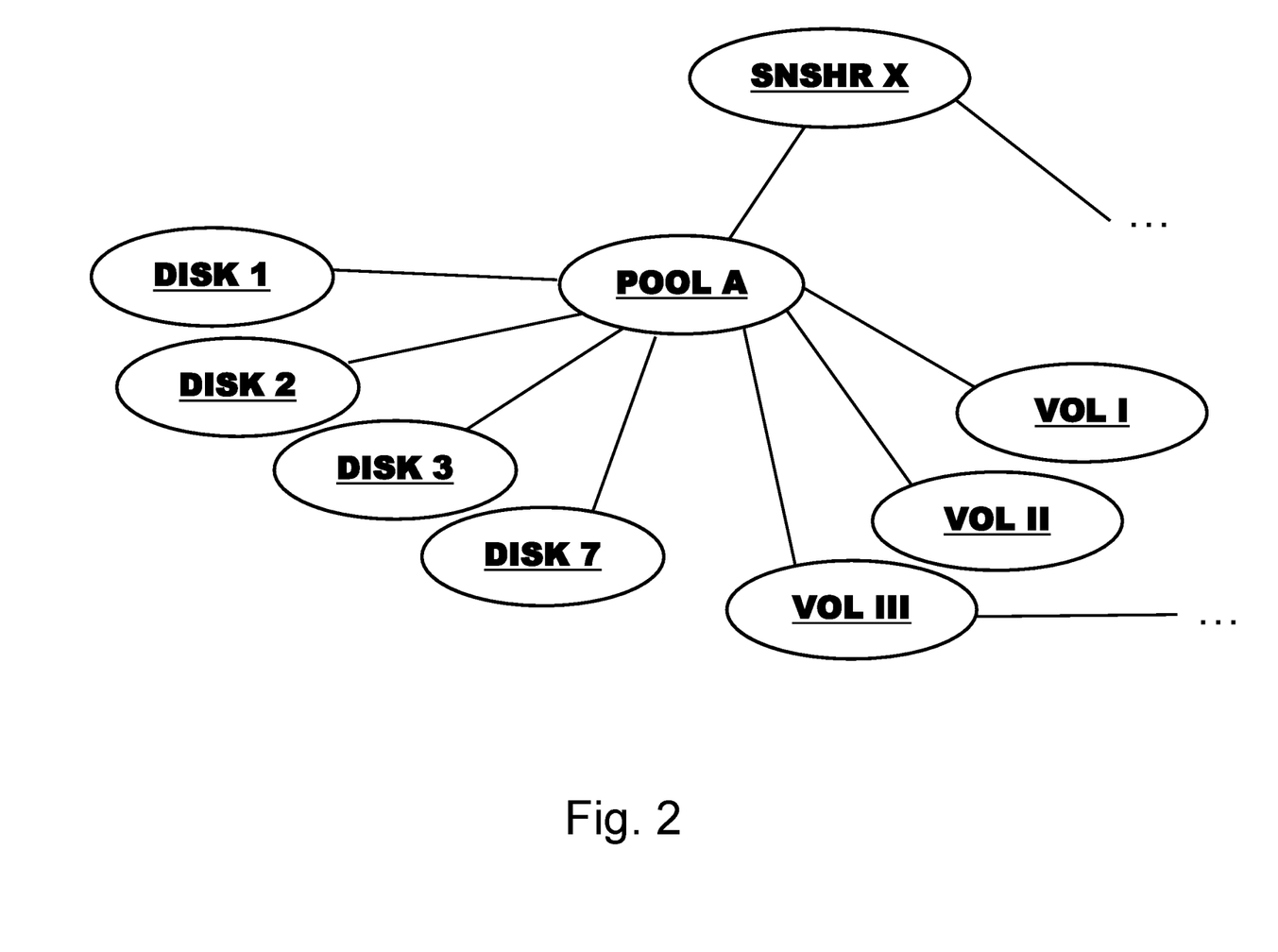
FIG. 2 provides a schematic illustration of an instantiated SNS resource tree, according to an embodiment of the invention.

As shown in FIG. 2, an event associated with Pool A leads to the instantiated tree depicting the relationship between Pool A and Disks 1, 2, 3, and 7, Volumes I, II, and III, and SNSHR X, and so on including all SNS resources linked to Pool A. The instantiated tree of FIG. 2 includes the current edge weightings (not shown) from the generic tree of FIG. 1. In an embodiment, the generic and instantiated trees of the SNS are generated and held virtually by the computing environment practicing the steps of the disclosed methods.

In an embodiment, the method uses the instantiated tree of FIG. 2 to identify additional events correlated to the origin event. In this embodiment, the method evaluates a second event alert after the origin event by instantiating a dependency tree for the second event, and then looking for previous events associated with SNS resources related to the resource of the current event alert. The method creates a new incident for events where no previous event at a related resource has occurred and adds the second event to the new incident.

For events having a previous event at a related resource, the method then considers the relative timing of the two events. The method evaluates subsequent events using a concurrence window, defined according to a maximum allowable time lapse between correlateable events. In an embodiment, the method considers events within a 30 second concurrence window. In an embodiment, the method evaluates the concurrence window over time with correlation accuracy feedback to lengthen or shorten the concurrence window as appropriate. Event alerts occurring outside the concurrence window are not correlated to the original event and the method generates a new incident and adds the subsequent event to the new incident.

In an embodiment, the method further evaluates event alerts within the concurrence window by determining a correlation factor of these events. In this embodiment, the method determines the correlation factor using the weightings between the SNS resource of the original event alert and the SNS resource of the subsequent event alert. As an example, from FIG. 2, the method determines the correlation factor for an original event associated with Pool A and by a subsequent event alert from Volume II occurring within the defined concurrence window using weighting $w_4$ from the instantiated tree for the first event alert. As a second example from FIG. 2, the method determines the correlation factor for an original event associated with Pool A and a subsequent event associated with Node 1, occurring within the concurrence window, using the combination of weightings $w_2$ and $w_1$. In an embodiment, the method determines the correlation factor by multiplying all relevant weightings together. For the examples above, the first correlation factor would be determined as $w_4$, while the second example correlation factor would be determined as $w_1 * w_2$. In this embodiment, events separated by greater "distances" on the instantiated SNS tree tend to have lower correlation factors as the determined correlation factor includes the product of more weightings.

In an embodiment, the method compares the determined correlation factor to a defined correlation threshold. Events having correlation factors above the defined threshold are correlated with and added to the incident of the first event. For events falling below the correlation threshold, the method generates a new incident and adds the events to it. In this embodiment, the method utilizes expert knowledge to define an initial correlation threshold and automatically adjusts, or auto-tunes, the correlation threshold according to user provided correlation accuracy feedback, as system tuning progresses. In an embodiment, the method augments the expert knowledge with correlation accuracy data from system tests in defining the initial correlation threshold values. In an embodiment, the method utilizes an initial correlation threshold value of between about 0.2 and about 0.5.

As provided above, initial dependency weights are defined using expert knowledge or assigned as a default value. Over time, as network activities are monitored by the method, dependency weights are adjusted from their initial values to increase the accuracy of the event alert correlations of the method. In an embodiment, the method adjusts the weights according to the time lapse between events associated with each SNS resource. In this embodiment, events at linked resource separated by short time intervals are presumed to be related. The weights associated with the links between these resources are increased by a small factor by multiplying the original weight by a factor slightly larger than 1. In an embodiment, the method decreases weights associated with links between resources for which concurrent events are infrequent. In this embodiment, the method decreases the weights by a small factor by multiplying the original weight by a factor smaller than 1. Over time, the weights associated with the links across the system are adjusted and auto tuned as a reflection of the concurrence of event between respective resources.

In an embodiment, the method calculates the adjustment factor $F_{inc}$ for increasing the weight w, as $F_{inc}=1.6*w^2-2.6*w+2$, and the factor $F_{dec}$ for decreasing the weight w as $F_{dec}=-0.5*w^2+0.1*w+1$. For this embodiment, the adjustment factors depend upon the current weight value. Increases become smaller as the weights approach 1 and decreases become smaller as the weights approach 0.

The adjustment relates to both the occurrence of events at related resource after a short time lapse and the frequency with which these events occur. Presumably linked events occurring at a high frequency result in a larger weight increase and low frequency event correlations result in a small increase or a decrease in the weighting value.

In an embodiment, the method uses user input or feedback on precious correlations as a factor in adjusting dependency weight values. In this embodiment, user feedback indicating successful correlations results in increasing associated dependency weight values as described above and feedback indicating correlation failures results in decreasing dependency weight values as described above. In an embodiment, both event correlation frequency and user correlation feedback data are used to adjust the dependency weights of the generic storage network system tree.

After the concurrence window for an incident has closed, the method provides notice of the incident to the system administrator according to defined preferences. Any event alerts occurring after the concurrence window has closed are considered unrelated to the incident. Notice may be provided using direct output to an application reporting screen for the administrator, adding the incident to a cumulative report listing, sending an SMS type text message, sending an email or other reporting means.

Figure 3:
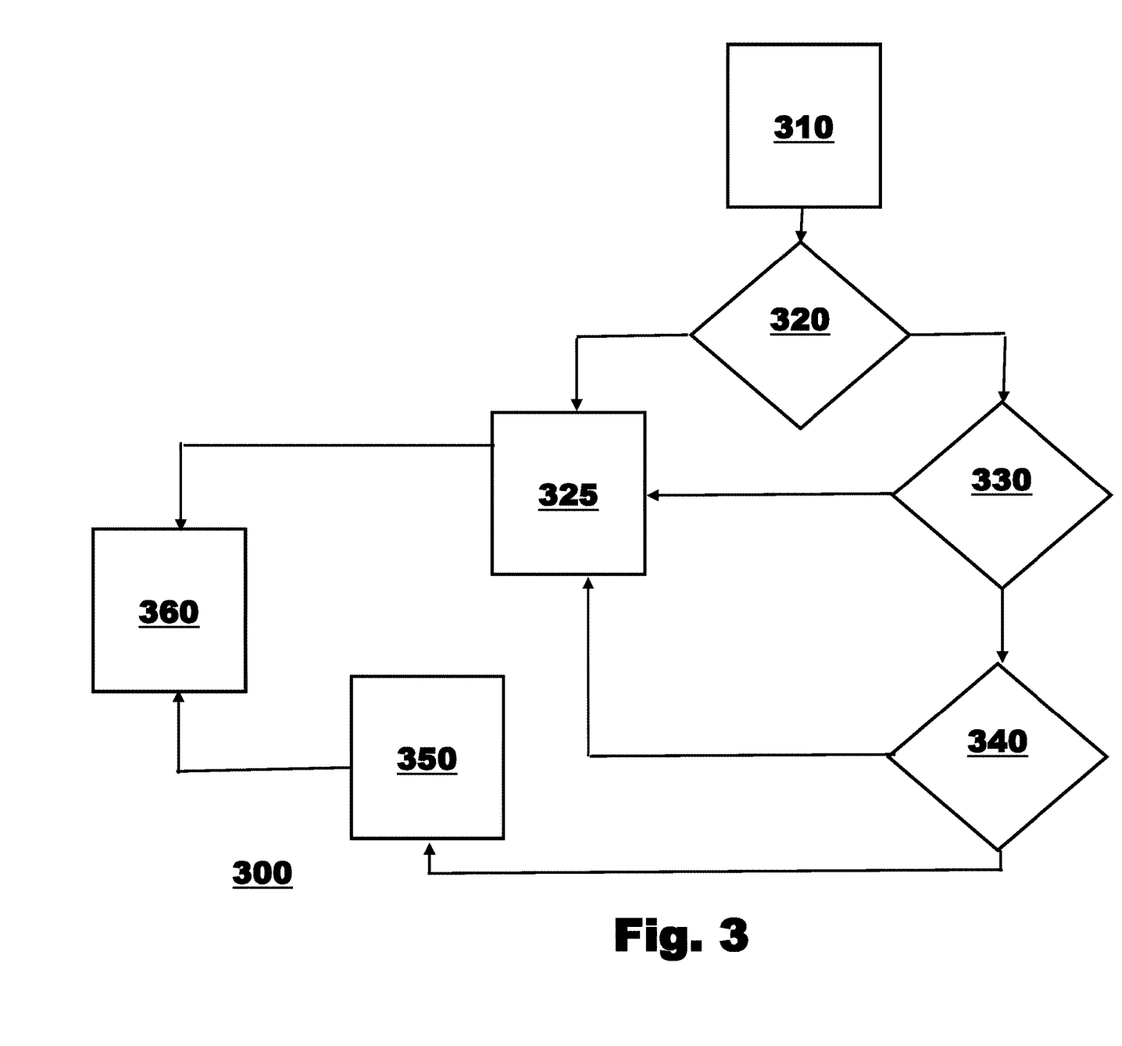
FIG. 3 provides a decision tree, according to an embodiment of the invention.

As shown in decision tree 300 of FIG. 3, the method receives an event at block 310 and instantiates a dependency tree for the associated SNS resource. At block 320 the method determines if a related event was determined before the current event. The method uses the relationships of the instantiated dependency tree to determine if an event is related to the current event. At block 325 the method creates an incident as no related event was found at block 320.

At block 330 the method checks the related event against the temporal concurrence window. Events outside the concurrence window pass to block 325 and the method creates a new incident for the event.

At block 340 the method determines the correlation factor for the related events and compares the determined correlation factor to the defined correlation threshold. In an embodiment, the method adjusts the defined threshold similarly to the dependency weight values, using correlation frequency and user feedback to adjust the threshold value. Related events below the correlation threshold are passed to clock 325 and the method creates a new incident for the event. Events above the correlation threshold are passed to block 350 and identified as related events. At block 360, the event is added to either the new incident from block 325, or to an existing incident from block 350.

Figure 4:
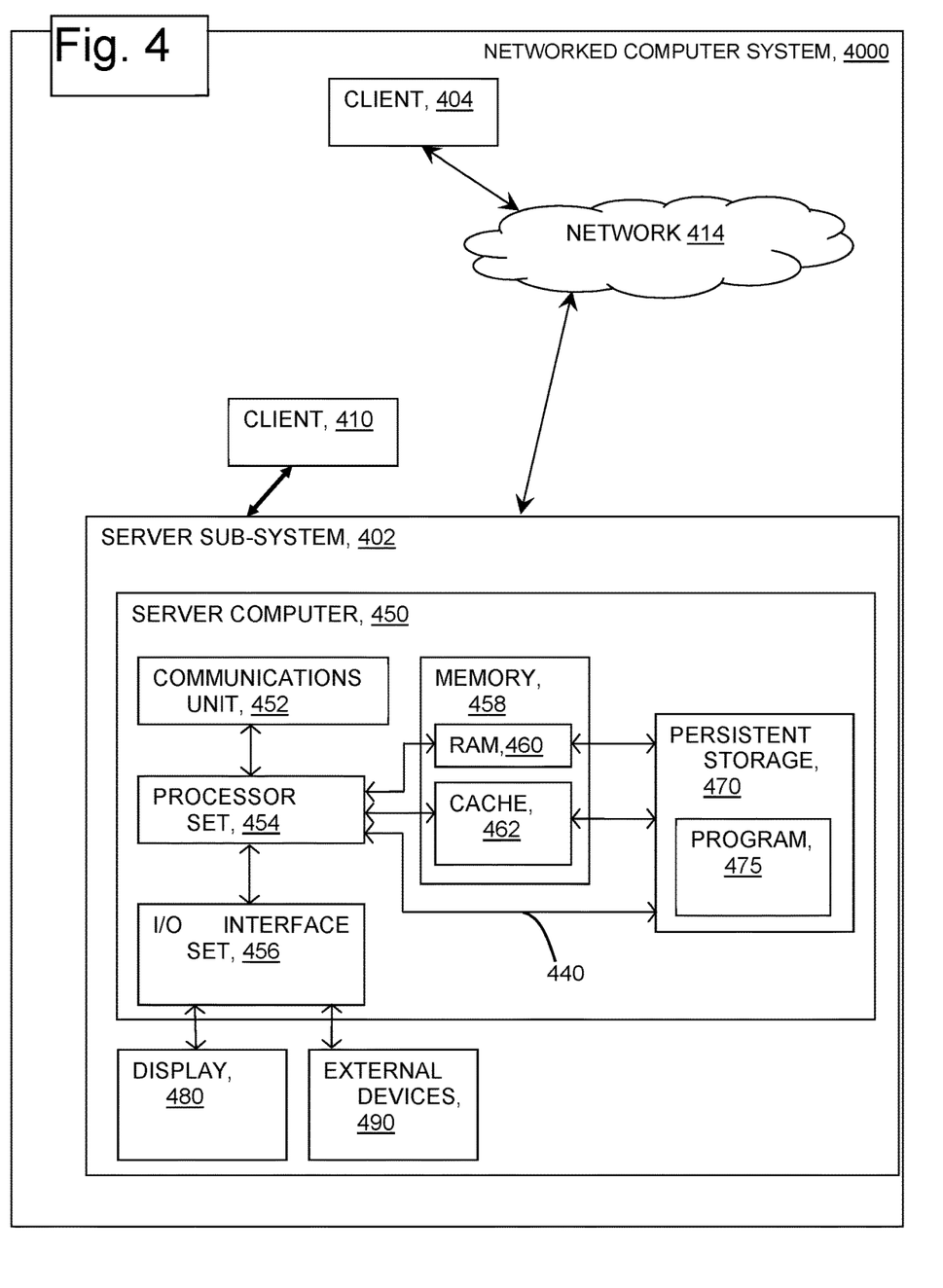
FIG. 4 provides a schematic illustration of a computing environment, according to an embodiment of the invention.

FIG. 4 provides a schematic illustration of exemplary network resources associated with practicing the disclosed inventions. The inventions may be practiced in the processors of any of the disclosed elements which process an instruction stream. As shown in the figure, a networked Client device 410 connects wirelessly to server sub-system 402. Client device 404 connects wirelessly to server sub-system 402 via network 414. In an embodiment, client devices 404 and 410 constitute portions of a storage network system and comprise event alert correlation program (not shown) together with sufficient computing resource (processor, memory, network communications hardware) to execute the program. As shown in FIG. 4, server sub-system 402 comprises a server computer 450. FIG. 4 depicts a block diagram of components of server computer 450 within a networked computer system 4000, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 450 of the SNS, can include processor(s) 454, memory 458, persistent storage 470, communications unit 452, input/output (I/O) interface(s) 456 and communications fabric 440. Communications fabric 440 provides communications between cache 462, memory 458, persistent storage 470, communications unit 452, and input/output (I/O) interface(s) 456. Communications fabric 440 can be implemented with any architecture designed for passing data and/or control information between processors (such as microprocessors, communications and network processors, etc.), system memory, peripheral devices, and any other hardware components within a system. For example, communications fabric 440 can be implemented with one or more buses.

Memory 458 and persistent storage 470 are computer readable storage media and may constitute portions of the overall SNS as well. In this embodiment, memory 458 includes random access memory (RAM) 460. In general, memory 458 can include any suitable volatile or non-volatile computer readable storage media. Cache 462 is a fast memory that enhances the performance of processor(s) 454 by holding recently accessed data, and data near recently accessed data, from memory 458.

Program instructions and data used to practice embodiments of the present invention, e.g., the event alert correlation program 475, are stored in persistent storage 470 for execution and/or access by one or more of the respective processor(s) 454 of server computer 450 via cache 462. In this embodiment, persistent storage 470 includes a magnetic hard disk drive. Alternatively, or in addition to a magnetic hard disk drive, persistent storage 470 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 470 may also be removable. For example, a removable hard drive may be used for persistent storage 470. Other examples include optical and magnetic disks, thumb drives, and smart cards that are inserted into a drive for transfer onto another computer readable storage medium that is also part of persistent storage 470.

Communications unit 452, in these examples, provides for communications with other data processing systems or devices, including resources of client computing devices 404, and 410. In these examples, communications unit 452 includes one or more network interface cards. Communications unit 452 may provide communications through the use of either or both physical and wireless communications links. Software distribution programs, and other programs and data used for implementation of the present invention, may be downloaded to persistent storage 470 of server computer 450 through communications unit 452.

I/O interface(s) 456 allows for input and output of data with other devices that may be connected to server computer 450. For example, I/O interface(s) 456 may provide a connection to external device(s) 490 such as a keyboard, a keypad, a touch screen, a microphone, a digital camera, SNS elements, and/or some other suitable input device. External device(s) 490 can also include portable computer readable storage media such as, for example, thumb drives, portable optical or magnetic disks, and memory cards. Software and data used to practice embodiments of the present invention, e.g., event alert correlation program 475 on server computer 450, can be stored on such portable computer readable storage media and can be loaded onto persistent storage 470 via I/O interface(s) 456. I/O interface(s) 456 also connect to a display 480.

Display 480 provides a mechanism to display data to a user and may be, for example, a computer monitor. Display 480 can also function as a touch screen, such as a display of a tablet computer.

Figure 5:
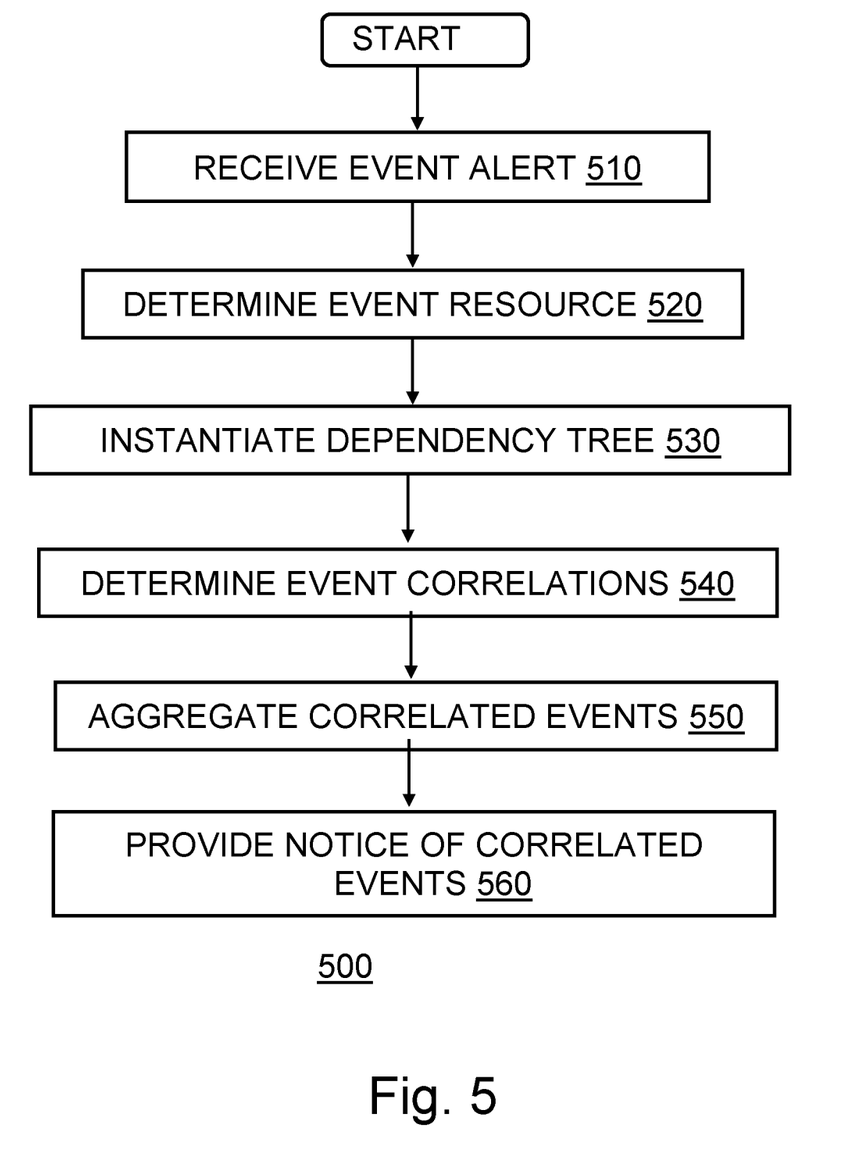
FIG. 5 provides a flowchart depicting an operational sequence, according to an embodiment of the invention.

FIG. 5 provides a flowchart 500, illustrating exemplary activities associated with the practice of the disclosure. At block 510, the method receives an event alert from an SNS resource or SNS resource monitoring system. The event alert may include an indication of the specific SNS resource associated with the event alert. At block 520 the method determines the SNS resource associated with the received event alert. In an embodiment, the method determines the associated resource from information included within the received event alert.

At block 530, the method instantiates a dependency tree from a generic dependency tree associated with the SNS. The instantiated dependency tree provides an indication of SNS resource related to the resource of the original event and the dependency weights associated with the resource dependency relationships. The weightings are taken from the current generic SNS resource tree and reflect the current evolution of the weights of the SNS resource dependencies.

At block 540, the method of event alert correlation program 475 determines dependency correlation factors between a first SNS resource associated with a first event, and a second SNS resource associated with a second, possibly correlated, event. In an embodiment, the method determines correlations according to a combination of temporal concurrence and a correlation factor derived using the dependency weights from the instantiated SNS tree.

At block 550, the method aggregates correlated events. The method correlates events occurring within a defined temporal concurrence window and having a correlation factor above a defined correlation threshold. Correlated events are added to a single incident for reporting. Uncorrelated events—those occurring outside the temporal concurrence window or having a correlation factor below a defined threshold—are added to separate incidents for reporting.

At block 560, the method of event alert correlation program 475 provides notice of incidents to a system administrator according to defined notification preferences. The method provides notice of correlated events aggregated as a single incident and uncorrelated events reported as separate incidents. Upon receiving notice, the system administrator reviews, prioritizes and addresses the SNS resource incidents.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
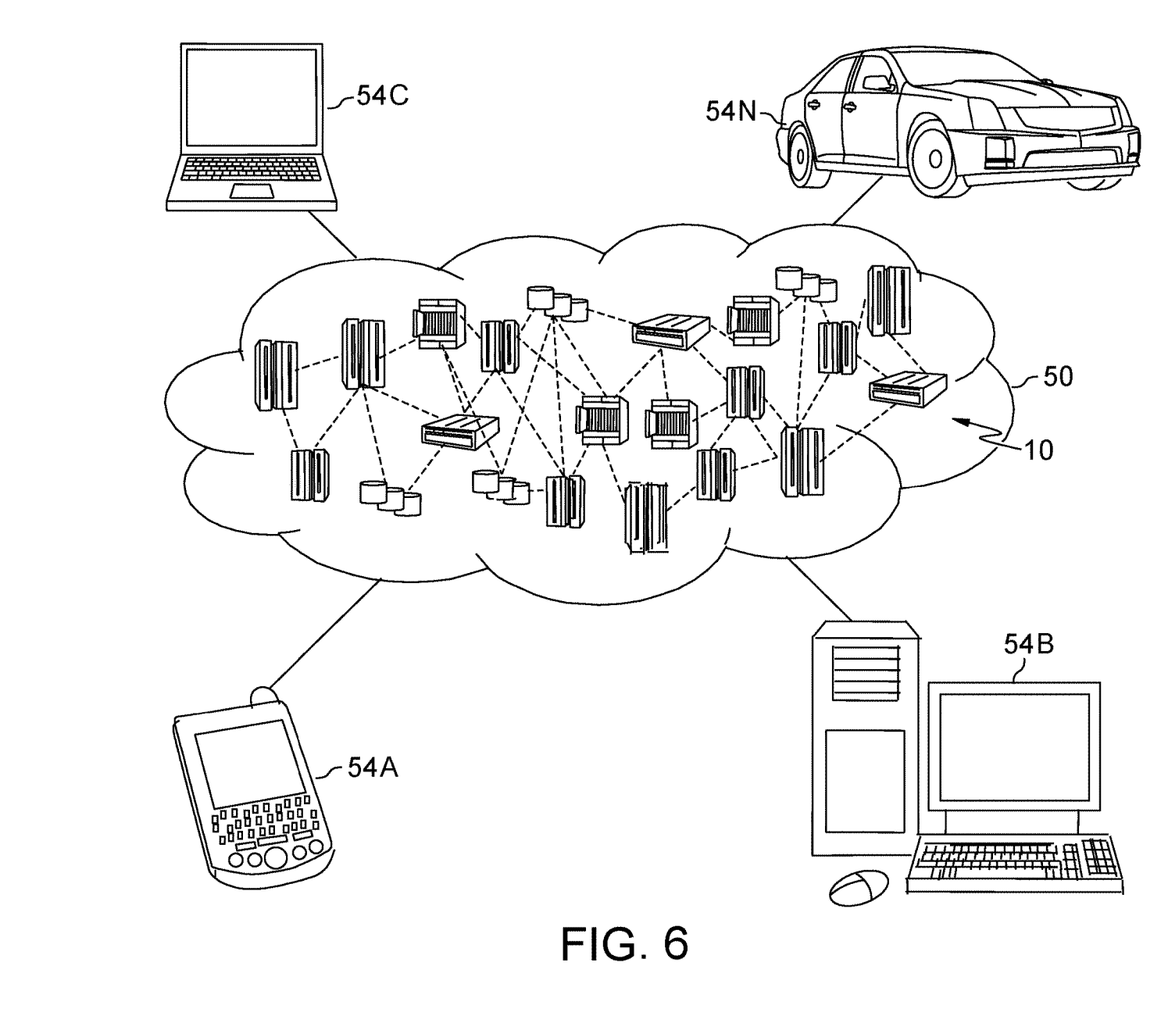
FIG. 6 depicts a cloud computing environment, according to an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
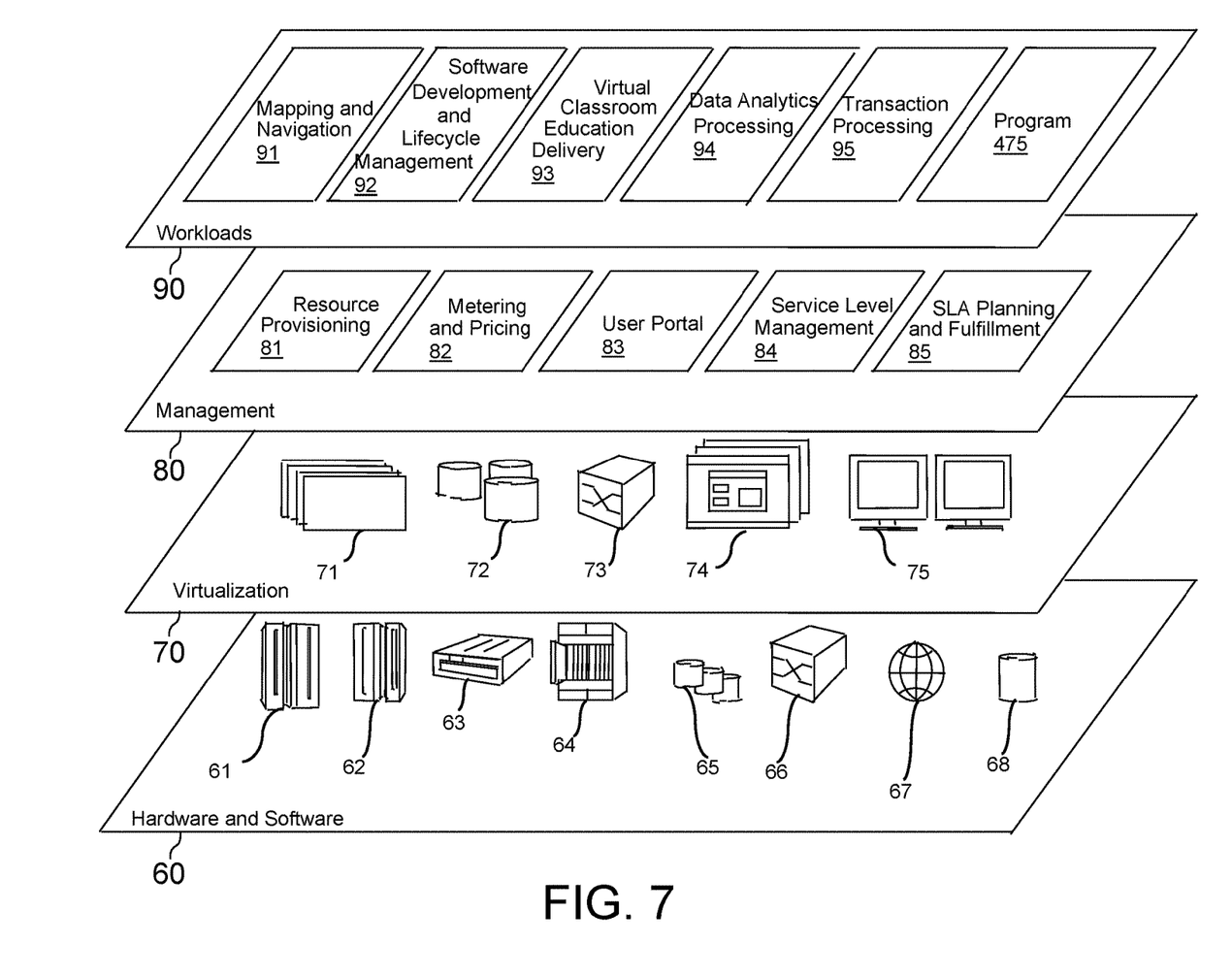
FIG. 7 depicts abstraction model layers, according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event alert correlation program 475.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for correlating storage system event alerts, the method comprising:
   receiving notice of an event;
   determining a first storage network system (SNS) resource related to the event;
   determining instantiated dependencies between the first SNS resource and a second SNS resource;
   defining dependency weights between SNS resources;
   automatically adjusting dependency weights according to storage network system event activities;
   correlating the event with a second event according to the instantiated dependencies; and
   providing notice of the correlated events.

2. The computer implemented method according to claim 1, wherein correlating the event with a second event comprises correlating the events according to instantiated dependencies between SNS resources.

3. The computer implemented method according to claim 1, wherein determining instantiated dependencies between the first SNS resource and a second SNS resource comprises determining instantiated dependencies according to a generic storage network system tree.

4. The computer implemented method according to claim 1, further comprising correlating the event with a second event according to a time between the events.

5. The computer implemented method according to claim 1, further comprising correlating the event with a second event according to a correlation factor.

6. A computer program product for correlating storage network system event alerts, the computer program product comprising one or more computer readable storage devices and program instructions collectively stored on the one or more computer readable storage devices, the program instructions comprising:
   program instructions to receive notice of an event;
   program instructions to determine a first storage network system (SNS) resource related to the event;
   program instructions to determine instantiated dependencies between the first SNS resource and a second SNS resource;
   program instructions to define dependency weights between SNS resources;
   program instructions to automatically adjust dependency weights according to storage network system event activities;
   program instructions to correlate the event with a second event according to the instantiated dependencies; and
   program instructions to provide notice of the correlated events.

7. The computer program product according to claim 6, wherein program instructions to correlate the event with a second event comprise program instructions to correlate the events according to instantiated dependencies between SNS resources.

8. The computer program product according to claim 6, wherein program instructions to determine instantiated dependencies between the first SNS resource and a second SNS resource comprise program instructions to determine instantiated dependencies according to a generic storage network system tree.

9. The computer program product according to claim 6, the program instructions further comprising program instructions to correlate the event with a second event according to a time between the events.

10. The computer program product according to claim 6, the program instructions further comprising program instructions to correlate the event with a second event according to a correlation factor.

11. A computer system for correlating storage network system event alerts, the computer system comprising:
   one or more computer processors;
   one or more computer readable storage devices; and
   stored program instructions on the one or more computer readable storage devices for execution by the one or more computer processors, the stored program instructions comprising:
      program instructions to receive notice of an event;
      program instructions to determine a first storage network system (SNS) resource related to the event;
      program instructions to determine instantiated dependencies between the first SNS resource and a second SNS resource;
      program instructions to define dependency weights between SNS resources;
      program instructions to automatically adjust dependency weights according to storage network system event activities;
      program instructions to correlate the event with a second event according to the instantiated dependencies; and
      program instructions to provide notice of the correlated events.

12. The computer system according to claim 11, wherein program instructions to determine instantiated dependencies between the first SNS resource and a second SNS resource comprise program instructions to determine instantiated dependencies according to a generic storage network system tree.

13. The computer system according to claim 11, the program instructions further comprising program instructions to correlate the event with a second event according to a time between the events.

14. The computer system according to claim 11, the program instructions further comprising program instructions to correlate the event with a second event according to a correlation factor.

* * * * *